(12) United States Patent
Hanrahan et al.

(10) Patent No.: US 7,611,303 B2
(45) Date of Patent: Nov. 3, 2009

(54) TOLERANCE RING WITH HIGH AXIAL STATIC FRICTION

(75) Inventors: Kevin P. Hanrahan, Santa Barbara, CA (US); David D. Dexter, Buellton, CA (US); Ryan J. Schmidt, Santa Barbara, CA (US); Matthew S. Sprankle, Santa Barbara, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 50 days.

(21) Appl. No.: 11/142,096

(22) Filed: Jun. 1, 2005

(65) Prior Publication Data

US 2006/0275076 A1 Dec. 7, 2006

(51) Int. Cl.
*F16B 2/22* (2006.01)
(52) U.S. Cl. .................. 403/372; 403/367; 411/521
(58) Field of Classification Search .............. 403/365, 403/367, 371, 372, 374.1; 411/520, 521, 411/529; 384/535, 581
See application file for complete search history.

(56) References Cited

U.S. PATENT DOCUMENTS

| | | | |
|---|---|---|---|
| 1,662,544 A | 3/1928 | Solenberger | |
| 2,606,220 A | * 8/1952 | Labastie | ............ 310/236 |
| 2,628,113 A | 2/1953 | Jones | |
| 2,897,026 A | 7/1959 | Haller et al. | |
| 2,931,412 A | 4/1960 | Wing | |
| 2,950,937 A | 8/1960 | Bedford, Jr. | |
| 3,061,386 A | 10/1962 | Dix et al. | |
| 3,125,397 A | 3/1964 | McGrath | |
| 3,142,887 A | 8/1964 | Hulck et al. | |
| 3,145,547 A | 8/1964 | Lyons | |
| 3,156,281 A | 11/1964 | Demi | |
| 3,197,243 A | 7/1965 | Brenneke | |
| 3,233,497 A | 2/1966 | McCormick | |
| 3,396,554 A | 8/1968 | Westercamp | |
| 3,494,676 A | 2/1970 | Compton | |
| 3,672,708 A | 6/1972 | Zemberry | |
| 3,700,271 A | 10/1972 | Blaurock et al. | |
| 3,730,569 A | 5/1973 | Feinler | |
| 3,768,845 A | 10/1973 | Gilliland | |
| 3,838,928 A | 10/1974 | Blaurock et al. | |
| 3,861,815 A | 1/1975 | Landaeus | |
| 4,069,618 A | 1/1978 | Geiss | |
| 4,222,310 A | 9/1980 | Garrett et al. | |
| 4,286,894 A | 9/1981 | Rongley | |
| 4,790,683 A | 12/1988 | Cramer, Jr. et al. | |
| 4,828,423 A | 5/1989 | Cramer, Jr. et al. | |
| 4,981,390 A | 1/1991 | Cramer, Jr. et al. | |

(Continued)

FOREIGN PATENT DOCUMENTS

DE          916370          8/1954

(Continued)

*Primary Examiner*—Michael P Ferguson

(57) ABSTRACT

A tolerance ring for applications requiring high axial static friction has contacting portions having a novel profile. The use of multiple contacting portions having a smaller size that are wedge-shaped increases rigidity and provides a directional grip that increases axial static function. Using multiple wedge-shaped contacting portions with appropriate opposite slants provides a balanced and symmetrical grip. Using inter-level wedge-shaped contacting portions with opposite slants provides a more aggressive grip while providing a tolerance ring that is more dynamically stable and has a high resonant frequency.

18 Claims, 4 Drawing Sheets

U.S. PATENT DOCUMENTS

| | | |
|---|---|---|
| 5,125,755 A | 6/1992 | Adler et al. |
| 5,492,429 A * | 2/1996 | Hodges ............... 403/372 |
| 5,575,691 A | 11/1996 | Matthews |
| 5,613,265 A | 3/1997 | Gemmell |
| 5,647,766 A | 7/1997 | Nguyen |
| 6,288,878 B1 | 9/2001 | Misso et al. |
| 6,288,879 B1 | 9/2001 | Misso et al. |
| 6,333,839 B1 | 12/2001 | Misso et al. |
| 6,411,472 B1 | 6/2002 | Allsup |
| 6,480,363 B1 | 11/2002 | Prater |
| 6,525,910 B1 | 2/2003 | Macpherson et al. |
| 6,527,449 B1 | 3/2003 | Koyama et al. |
| 2002/0024770 A1 | 2/2002 | Hong et al. |
| 2003/0156357 A1 | 8/2003 | Brink et al. |
| 2004/0145830 A1 | 7/2004 | Brink et al. |
| 2004/0238944 A1 | 12/2004 | Bish et al. |
| 2005/0225903 A1 | 10/2005 | Sprankle et al. |

FOREIGN PATENT DOCUMENTS

| | | |
|---|---|---|
| DE | 1 855 948 | 8/1962 |
| DE | 29 50 985 | 12/1979 |
| EP | 1 067 336 | 1/2001 |
| FR | 2 627 620 | 12/1988 |
| GB | 1094610 | 6/1965 |
| GB | 1297599 | 4/1971 |
| GB | 1386738 | 2/1973 |
| GB | 2382386 | 5/2003 |
| GB | 2413594 | 11/2005 |
| GB | 2413608 | 11/2005 |
| JP | 2005-114025 | 4/2005 |
| WO | WO 01/41136 | 6/2001 |
| WO | WO 03/025907 | 3/2003 |
| WO | WO 2005/106268 | 11/2005 |
| WO | WO 2006/056731 | 6/2006 |

* cited by examiner

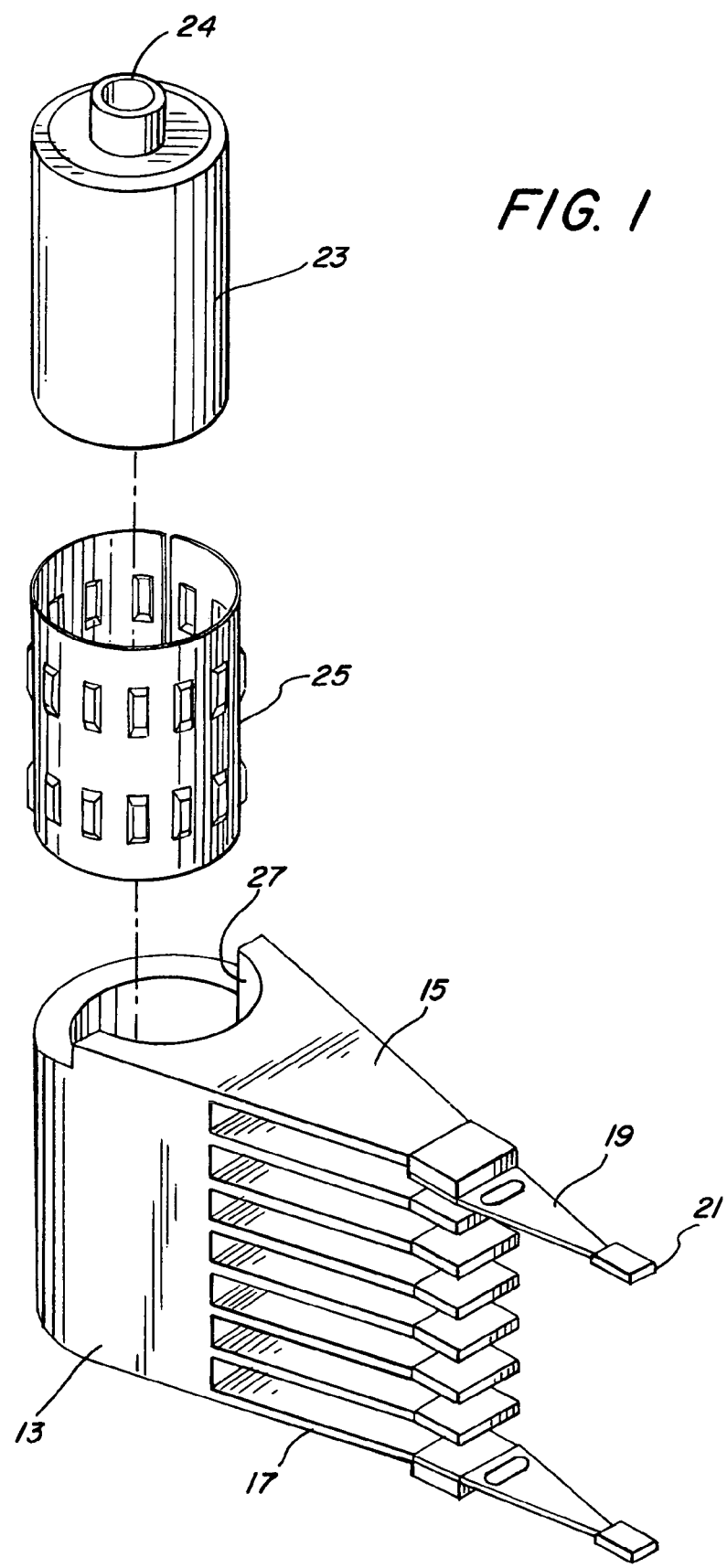

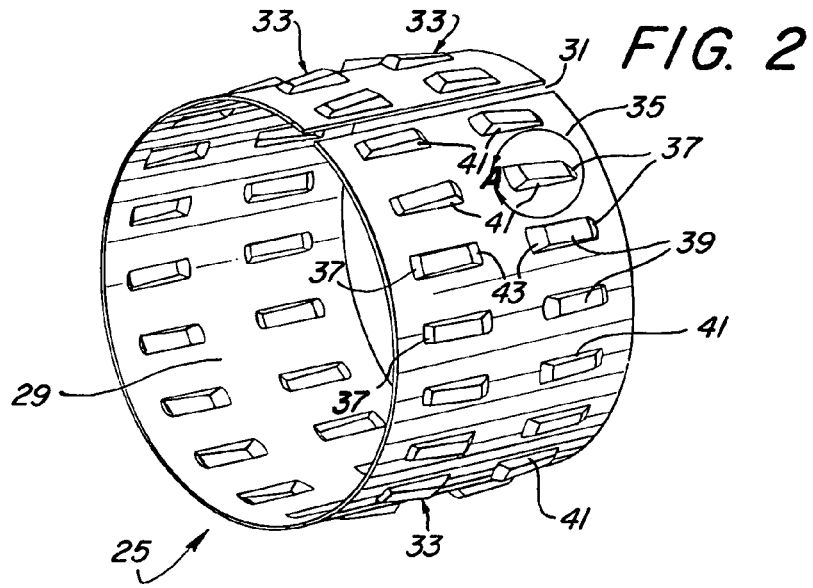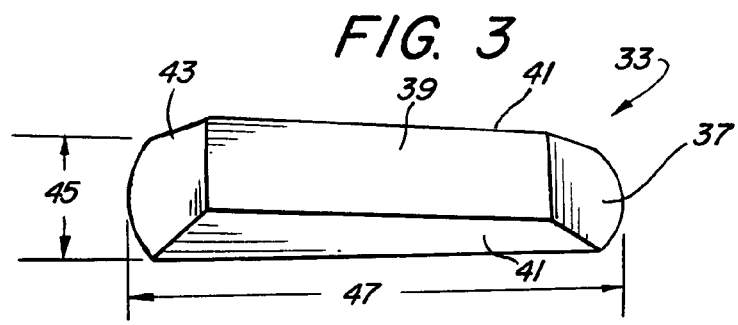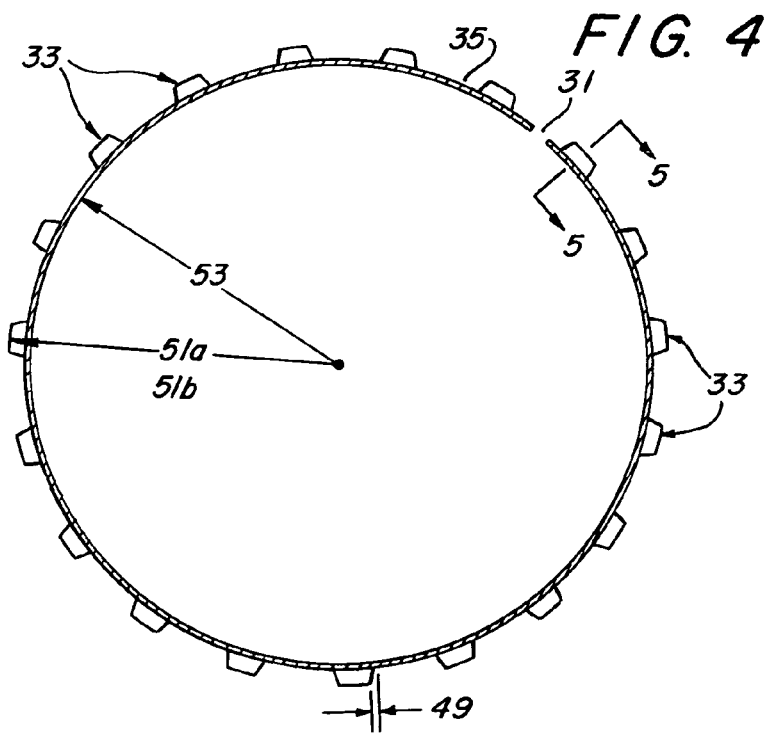

TOLERANCE RING WITH HIGH AXIAL STATIC FRICTION

BACKGROUND OF THE INVENTION

1. Field of the Invention

This invention relates generally to bearing tolerance rings and, more specifically, pertains to tolerance rings used in cartridge bearings for actuator arms in information storage devices.

2. Description of Prior Art

A key component of any computer system is a device to store data. One common place for storing massive amounts of data in a computer system is on a disc drive. The most basic parts of a disc drive are a disc that is rotated, an actuator that moves a transducer to various locations on the disc, and electrical circuitry that is used to write and read data on and from the disc. There are a variety of disc drives in use such as hard disc drives, zip drives, floppy disc drives which all utilize either rotary or linear actuators.

In disc drive systems, magnetic heads read and write data on the surface of co-rotating discs that are coaxially mounted on the spindle motor. The bits of information written on a disc are laid out in concentric circular tracks on the surface of the discs. The discs must rotate quickly so that the computer user does not have to wait long for a desired bit of information on the disc surface to translate to a position under the head. In modern disc drives, especially in hard disk drives, data bits and tracks must be extremely narrow and closely spaced to achieve a high information density per unit area of the disc surface.

The required small size and close spacing of information bits on the disc surface have the consequences on the design of the disc drive device and its mechanical components. The most important consequence is the magnetic transducer on the head must operate in extremely close proximity to the magnetic surface of the disc. Because there is relative motion between the disc surface and the head due to the disc rotation and head actuation, continuous contact between the head and disc can lead to failure of the interface. Such failure can damage the disc and head and usually causes data loss. To avoid this problem, a magnetic head is typically designed to be hydrodynamically supported by an extremely thin air bearing surface ("ABS"). When a disc rotates, air is dragged between the head and the disc surface, causing pressure, which forces the head away from the disc. At the same time, the air rushing past the head and disc produces a negative pressure area. These forces are designed to balance so that the magnetic head flies over the surface of the disc at a particularly desired fly height in very close proximity to the disc while avoiding physical contact between the head and disc. In typical systems, the spacing between the head and disc during operation is extremely small, measuring in the tens of nanometers.

Another consequence of the close spacing required between the bits and tracks written on the disc surface is that the spindle rotation and head actuator motion must be operated with extremely high precision. The head actuator must have structural characteristics that allow it to be actively controlled to quickly seek different tracks of information and then precisely follow small disturbances in the rotational motion of the disc while following the tracks. The characteristics of the actuator structure that are important to this end, include stiffness, mass, geometry, and boundary conditions. For example, one important boundary condition is the rigidity of the interface between the actuator arm and the actuator pivot bearing.

All structural characteristics of the actuator must be considered by the designer to minimize vibration in response to rapid angular motions and other excitations. For example, the actuator arm cannot be designed to be too massive because it must accelerate very quickly to reach information tracks containing desired information. Otherwise, the time to access desired information may be unacceptable to the user. On the other hand, the actuator arm must stiff enough and the actuator pivot bearing must be of high enough quality so that the position of the head can be precisely controlled during operation. The interface between the actuator arm and the pivot bearing must be of sufficient rigidity and strength to enable precise control of a head position during operation and to provide the boundary conditions necessary to facilitate higher natural resonant frequencies of operation of the actuator arm structure. Actuator arm stiffness must also be sufficient to limit deflection that might cause contact with the disc during mechanical shock events that may occur during operation or non-operation. The interface between the actuator arm and the pivot bearing must be of sufficient strength to prevent catastrophic structural failure such as actual slippage between the actuator arm and the actuator pivot-bearing sleeve, during large mechanical shock events.

In many disc drives, the actuator arm or arms are fixed to the actuator pivot bearing by a tolerance ring. Typically, tolerance rings include a cylindrical base portion and a plurality of contacting portions that are raised or recessed from the cylindrical base portion. The contacting portions are typically partially compressed during installation to create a radial preload between the mating cylindrical features of the parts joined by the tolerance ring. The radial preload compression provides frictional engagement that prevents actual slippage of the mating parts. For example, in disc drive applications, the radial compressive preload of the tolerance ring prevents separation and slippage at the interface between the actuator arm and the pivot bearing during operation and during mechanical shock events. The tolerance ring also acts as a radial spring. In this way, the tolerance ring positions the interior cylindrical part relative to the exterior cylindrical part while making up for radii clearance and manufacturing variations in the radius of the parts.

Additional features have been added to tolerance rings to obtain the specific advantages. For example, in U.S. Pat. No. 6,288,878 to Misso et al., circumferential brace portions have been added to the tolerance ring to increase hoop strength. U.S. Pat. No. 6,338,839 to Misso et al. discloses a tolerance ring which provides a low consistent installation force profile.

U.S. Pat. No. 4,790,683 to Cramer, Jr. et al. discloses the use of a conventional tolerance ring in conjunction with a cylindrical shim in applications characterized by structurally significant radial vibration or loading. The shim prevents deformation of the soft underlying material and thereby prevents undesirable partial relief of the radial compression that maintains frictional engagement of the tolerance ring.

State of the art tolerance rings are typically manufactured from a flat metal sheet with stamping, forming, rolling, and other steps to provide ways to recess contacting portions and a final generally cylindrical shape. The tolerance ring can be installed first into a generally cylindrical hole in an exterior part, such as an actuator arm, so that later a generally cylindrical inner part, such as an actuator pivot bearing, can be forcibly pushed into the interior of the tolerance ring to create a radial compressive preload that retains the parts by frictional engagement. In this case, the contacting portions may be recessed to a lesser radius than the base portion as well as raised to a greater radius than the base portion. Alternatively, a tolerance ring can be installed first around a generally cylindrical inner part, such an actuator pivot bearing. The inner part, together with the tolerance ring, is then forcibly pushed into the interior of the generally cylindrical hole in an exterior part, such as an actuator arm, to create a radial compressive preload that retains the parts by frictional engagement. In this case, the contacting portions of the tolerance ring are typically raised to a greater radius than the base portion.

There is a need in the art for a tolerance ring that can accommodate thermal mismatches that might occur between the bearing cartridge and the actuator arm as the disc drive heats from a starting temperature to an operating temperature. Moreover, there is a need for a tolerance ring that provides an increased internal diameter static friction that not only provides better performance, but prevents the tolerance ring from slipping during operation as a result of a shock event.

SUMMARY OF THE INVENTION

A tolerance ring having a substantially cylindrical base portion with a plurality of contacting portions, the base portion being at a first radius, each contacting portion having a central region with a nadir at a second radius and an apex at a third radius. Each contacting portion has at least two circumferential transition regions adjacent to the central region, the circumferential transition regions spanning from the first radius to the second and third radii over a circumferential transition length. Each contacting portion also has a first and second axial transition region, the first axial transition region spanning from the first radius to the second radius over an axial transition length, and the second axial transition region spanning from the first radius to the third radius over an axial transition length. The contacting portions are arranged on the base portion in multiple rows about the circumference of the cylindrical base. In one preferred embodiment, all the contacting portions are arranged in multiple parallel circumferential rows with the apex of the central region of each contacting portion located at an inside circumference. In a second preferred embodiment, all the contacting portions are arranged in multiple parallel circumferential rows with each axial pair of contacting portions, one in each parallel row, alternating between having the apex of their central regions at an inside circumference and at an outside circumference. In a third preferred embodiment, four parallel rows of contact portions are arranged with each axial pair in staggered rows, the contact portions of each pair alternating between having the apex of their central regions at an inside circumference and at an outside circumference.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 1 is an exploded view of a disc drive actuator arm assembly, including a tolerance ring, according to an embodiment of the present invention.

FIG. 2 is a perspective view of a tolerance ring according to an embodiment of the present invention.

FIG. 3 is a detailed perspective view of a single contacting portion of the area A on the tolerance ring of FIG. 1.

FIG. 4 is an axial view of a tolerance ring according to an embodiment of the present invention.

Figure 5:
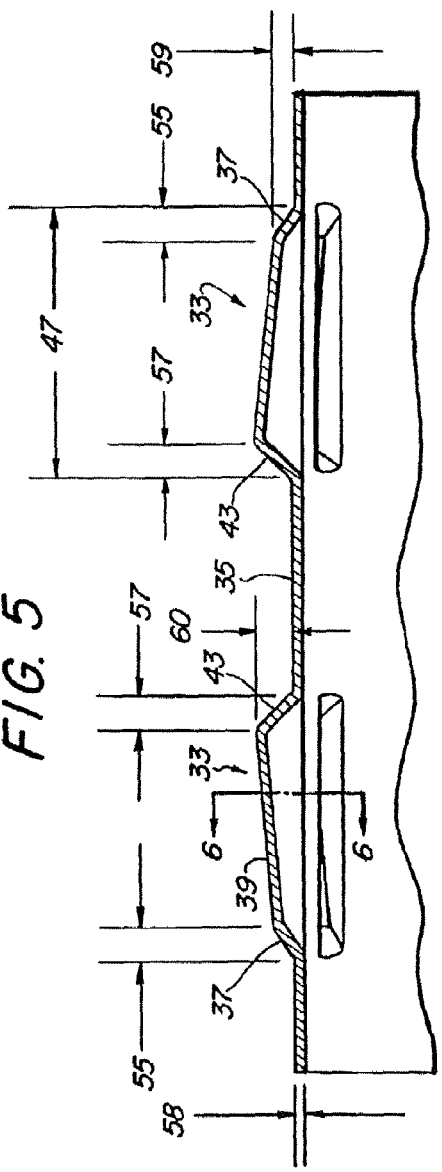
FIG. 5 is a cross-sectional view of the tolerance ring of FIG. 4, taken along the cross-sectional line 5-5 in FIG. 1.

It should be understood that the sizes of the different components in the figures may not be to scale or in exact proportion and are shown for visual clarity and for purpose of explanation only.

DETAILED DESCRIPTION OF THE PREFERRED EMBODIMENTS

Although the invention described in this application is useful with all mechanical configurations of disc drives having rotary actuation, and is useful for all types of devices whose precise co-axial location of mating parts is desirable; it has particular application to hard disc drive systems.

FIG. 1 is an exploded view of an actuator arm assembly 13 which includes a bearing cartridge 23. The bearing cartridge is cylindrical in shape and includes a shaft 24 about which the actuator arm assembly 13 rotates. The actuator arm assembly 13 has an opening or bore 27 therein. The bearing cartridge 23 fits within the bore 27 of actuator arm assembly 13. The tolerance ring 25 fits within the space between the bore 27 and the outside diameter of the bearing cartridge 23.

Actuator arm assembly 13 has a plurality of arms 15 in the comb assembly 17. Each arm 15 typically carries at least one suspension 19. Attached to the suspension 19 are recording heads (sliders) 21 which include magnetic transducers that magnetize the surface of the disc (not shown) to represent and store the desired data.

As is well known in the art of disc drives, each of the discs has a series of concentric tracks onto which the magnetic information is recorded. The sliders 21 and the magnetic transducers incorporated therein are moved over the surface of a particular disc so that a magnetic representation of data can be stored on any of the tracks on the disc. The particular actuator arm assembly 13 shown in FIG. 1 causes transducer movement to be rotational and about the shaft 24 of bearing cartridge 23. Rotating the actuator arm assembly 13 causes the slider 21 and the transducer in the slider to be repositioned over the surface of the disc below it.

FIG. 2 illustrates in perspective a tolerance ring 25 according to a preferred embodiment of the present invention. The tolerance ring 25 has a cylindrical base portion 35 and a plurality of contacting portions 33. Elastic radial expansion and contraction of cylindrical opening 29 of the tolerance ring 25 is facilitated by an axially oriented gap 31 in the circumference of tolerance ring 25. The contacting portions 33 have central regions or surfaces 39, angled circumferential transition regions or surfaces 41, and axial transition regions or surfaces 37 and 43.

FIG. 3 is an expanded view of a single contacting portion 33 within the detailed region A of the tolerance ring 25 of FIG. 2 and depicts the regions of the contacting portion with greater clarity. Contacting portion 33 has an overall axial length 47 and an overall circumferential width 45. The circumferential transition regions 41 are steeper than the axial transition regions 43, 37, thereby providing greater radial stiffness.

The circumferential regions 41 are generally in the shape of a four-sided figure with none of the sides being parallel. The shape results from the size and height difference between axial transition region 43 and axial transition region 37. The figure illustrates the central region edge next to axial transition region 43 to be higher than the central region next to axial transition region 37.

A first axial transition region 37 spans from a first radius of the cylindrical base portion 35 to a second radius over a first axial transition length. A second axial transition region 43 spans from the first radius of the cylindrical base portion 35 to a third radius. As illustrated in FIG. 3, this third radius is greater than the second radius of the first axial transition region 37, and greater than the first radius of the cylindrical base portion 35. It could just as well be smaller. Moreover, the second and third radii could both be smaller than the first radius, if preferred.

The preferred embodiment of FIG. 2 shows a plurality of contacting portions 33 arranged in parallel circumferential rows on the outside surface of cylindrical base portion 35. Each individual contact portion 33 is arranged so that the second axial transition length of transition region 43 is located at an inside circumference. The first axial transition length of the first axial transition region 37 of each contacting portion 33 is located at an outside circumference of the cylindrical base portion 35.

Although FIG. 2 illustrates the contacting portions 33 extending from the outside surface of cylindrical base portion 35, the contacting portions 33 could also be located on or extending from the inside surface of cylindrical base portion 35. Either arrangement is considered a preferred embodiment of this invention.

FIG. 4 is an axial view of a tolerance ring according to a preferred embodiment of the present invention. The cylindrical base portion 35 has a first radius 53. The contact portions 33 each have two radii 51a and 51b, the second radius 51a at a first edge is less than a third radius 51b at a second edge. Both radii 51a and 51b are larger than the radius 53 of cylindrical base portion 35. However, it should be understood that both radius 51a and 51b would be smaller than the radius 53 of base portion 35, if the contacting portions 33 were chosen to point inwardly rather than outwardly, as shown in FIG. 4. FIG. 4 also illustrates the relatively narrow, steep profile of the circumferential transition regions 41 which span from a cylindrical base portion radius 53 to the contact portion radius 51a and 51b over circumferential transition lengths 41.

FIG. 5 is a cross-sectional view of the tolerance ring of FIG. 4 taken along the cross-sectional plane labelled "5-5" in FIG. 4. FIG. 5 most clearly illustrates the wedge-shaped profile of the contact portions 33 and specifically the directional gripping created by the difference between the height 59 of the first axial transition region 37 and the height 60 of the second axial transition region 43.

Figure 5A:
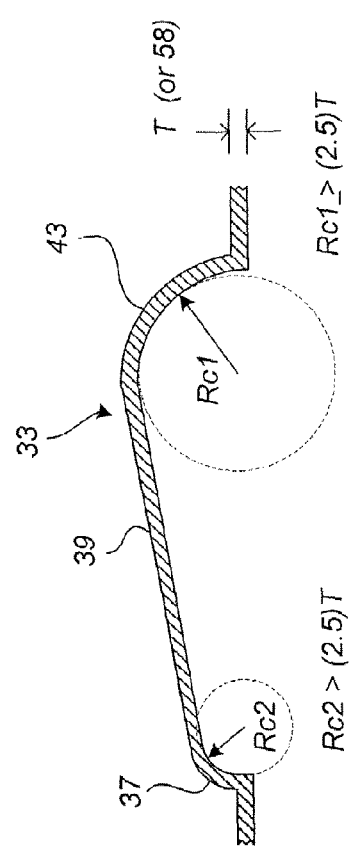
FIG. 5a is a magnified cross-sectional view of another tolerance ring according to the invention, taken along section line 5-5 in FIG. 4, in which the axial transition region of the contact portion has a radius of curvature.

The first axial transition region 37 and the second axial transition region 43 are illustrated as straight-line transition regions. These regions could also have a radius of curvature, Rc1 or Rc2, as shown in the magnified cross-sectional view of FIG. 5a. Whether the axial transition region 43 has a radius of curvature or is more of a straight line, the radius of curvature is preferably at least two and a half times the thickness T or 58, of the material from which the tolerance ring is fabricated.

In a preferred embodiment, the ratio of axial transition length 57 to the overall axial length 47 (FIGS. 3, 5) is more than the ratio of the circumferential transition length 49 (FIGS. 4, 6) to the overall circumferential width 45 (FIG. 3), but less than 250 times the ratio of the circumferential transition length 49 (FIGS. 4, 6) to overall circumferential width 45 (FIG. 3).

In an alternate preferred embodiment, the ratio of circumferential transition length 49 (FIGS. 4, 6) to overall circumferential width 45 (FIGS. 4, 6) is less than or equal to 0.4.

The use of many contacting portions 33 that are smaller in size improves the contact area and provides increased rigidity. The use of contact portions shaped as wedges creates a more directional gripping action, which can be used to advantage. Once the tolerance ring with these wedge-shaped contact portions is inserted into the base 27 of the actuator arm 13, the wedge-shaped contact portions will grip the inside diameter of the bore 27 when the bearing cartridge 23 is inserted. If the contact portions 33 are located on the inside surface of the base portion 35, the contact portions will grip the outside diameter of the bearing cartridge 23 when the bearing and tolerance ring are inserted into the bore 27 of actuator assembly 13.

Figure 6:
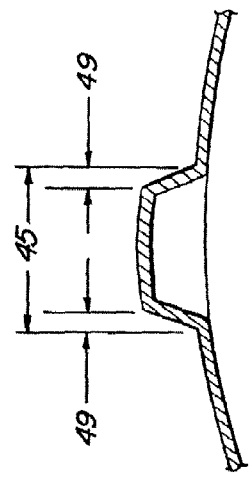
FIG. 6 is a cross-sectional view along the circumference of a single contacting portion of the area A on the tolerance ring of FIG. 1.
Figure 7:
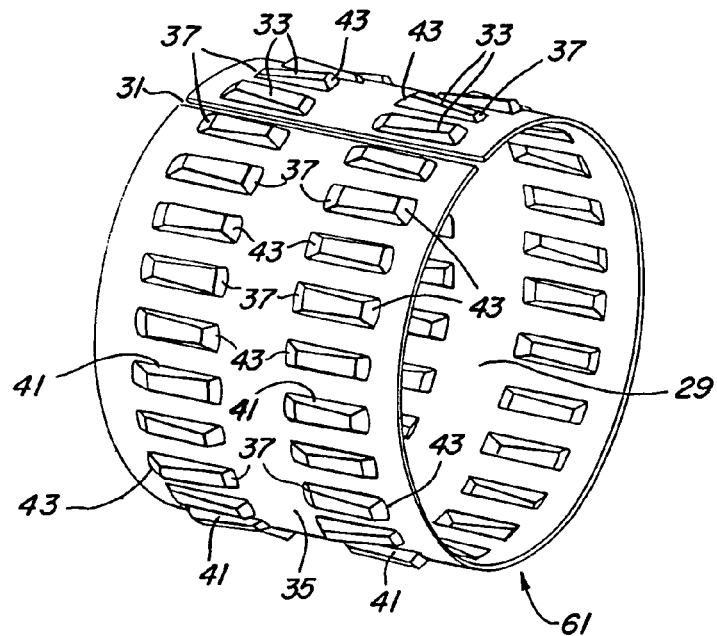
FIG. 7 is a perspective view of a tolerance ring according to another embodiment of the present invention.

FIG. 7 shows a perspective view of a tolerance ring 61 according to another preferred embodiment of the present invention. The tolerance ring 61 has a cylindrical base portion 35 with a plurality of contact portions 33 located in parallel circumferential rows about the surface of base portion 35. The contact portions 33 are arranged in pairs so that the axially aligned contact portions 33 in the parallel rows have either their first axial transition regions 37 located at an inside boundary of a circumferential row or their second axial transitional regions 43 located at an inside boundary of the circumferential row, in alternate fashion, as shown in FIG. 6. This alternating of the wedge-shaped contact portions creates a more balanced and symmetrical gripping force.

Figure 8:
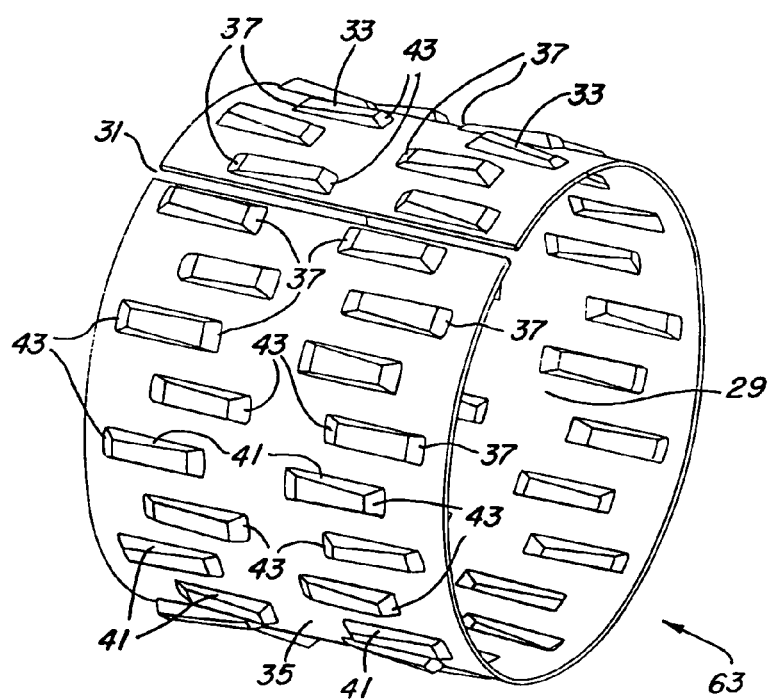
FIG. 8 is a perspective view of a tolerance ring according to yet another embodiment of the present invention.

FIG. 8 is a perspective view of a tolerance ring 63 according to another preferred embodiment of the present invention. The tolerance ring 63 has a cylindrical base portion 35 and a plurality of contact portions 33 arranged in multiple parallel circumferential rows about the cylindrical base portion 35. The preferred embodiment of FIG. 8 illustrates four parallel rows with every two parallel rows overlapping. The contact portions are arranged in adjacent rows to create a staggered arrangement of contact portions 33. The axially aligned pairs of contact portions 33 are arranged to have one pair with their second axial transition regions located at an inside boundary of a circumferential row, alternating with an adjacent pair of axially aligned contact portions with their first axial transition regions located at an inside boundary of a circumferential row, as illustrated in FIG. 8. This arrangement of contacting portions has an advantage even when the contacting portions are not wedge-shaped, but are symmetrical as shown in co-pending application U.S. Ser. No. 11/059,813 filed on Feb. 17, 2005 for Tolerance Ring With Debris-Reducing Profile.

Interleaving the wedge-shaped contact portions 33 in this manner creates a more dynamically stable and higher resonant frequency structure and significantly increase the gripping force. The directionally opposite wedge-shaped contact portions provide a more aggressive grip formation. Use of symmetrical contacting portions produces a more dynamically stable and higher resonant frequency structure.

What is claimed is:

1. A tolerance ring, comprising:
   a substantial cylindrical base portion having a constant first radius along an axial length of the base portion; and
   a plurality of circumferentially spaced radially outwardly projecting contacting portions on the surface of the base portion, each contacting portion comprising:
   a central surface longitudinally extending parallel to an axis of the base portion with a first edge having a second radius greater than the first radius at a first longitudinal end of the central surface and a second edge having a third radius greater than the second radius at a second longitudinal end of the central surface, opposing circumferential edges of the central surface extending between the first and second edges, an angled circumferential transition surface extending along each circumferential edge of the central surface and extending circumferentially from the first radius of the base portion to the second and third radii of the first and second edges over a circumferential transition length, each circumferential transition surface decreasing in radius at a constant angle from the second edge to the first edge along the longitudinal length of the central surface, a first axial transition surface extending along the first edge of the central surface between the opposing circumferential transition surfaces and extending axially from the first radius of the base portion to the first edge of the central surface over a first axial transition length, and a second axial transition surface extending along the second edge of the central surface between the opposing circumferential transition surfaces and extending axially from the first radius of the base portion to the second edge of the central surface over a second axial transition length, wherein the central surface, the circumferential transition surfaces and the first and second axial transition surfaces adjoin one another to form an outer surface of the contacting portion.

2. The tolerance ring of claim 1 wherein the substantial cylindrical base portion has a material thickness and wherein the first axial transition surface and the second axial transition surface have a straight line profile.

3. The tolerance ring of claim 1 wherein the substantial cylindrical base portion has a material thickness and wherein the first axial transition surface and the second axial transition surface have a curved profile with a radius of curvature at least 2.5 times the material thickness of the cylindrical base portion.

4. The tolerance ring of claim 1 wherein each contacting portion has an overall axial length and an overall circumferential width, with the ratio of the first or second axial transition length to the overall axial length being greater than the ratio of the circumferential transition length to the overall circumferential width, but less than 250 times the ratio of the circumferential transition length to the overall circumferential width.

5. The tolerance ring of claim 1 wherein each contacting portion has an overall circumferential width, with the ratio of the circumferential transition length to the overall circumferential width being equal to or less than 0.4.

6. The tolerance ring of claim 1 wherein each contacting portion has an overall axial length and an overall circumferential width with the plurality of contacting portions arranged in multiple parallel circumferential rows of circumferentially spaced contacting portions about the cylindrical base portion.

7. The tolerance ring of claim 6 wherein the second axial transition length of each contacting portion is located at an inside boundary of each circumferential row.

8. The tolerance ring of claim 7 wherein the substantial cylindrical base portion has a material thickness and wherein the first axial transition surface and the second axial transition surface have a straight line profile.

9. The tolerance ring of claim 7 wherein the substantial cylindrical base portion has a material thickness and wherein the first axial transition surface and the second axial transition surface have a curved profile with a radius of curvature at least 2.5 times the material thickness of the cylindrical base portion.

10. The tolerance ring of claim 7 wherein each contacting portion has an overall axial length and an overall circumferential width, with the ratio of the first or second axial transition length to the overall axial length being greater than the ratio of the circumferential transition length to the overall circumferential width, but less than 250 times the ratio of the circumferential transition length to the overall circumferential width.

11. The tolerance ring of claim 7 wherein each contacting portion has an overall circumferential width, with the ratio of the circumferential transition length to the overall circumferential width being equal to or less than 0.4.

12. The tolerance ring of claim 1 wherein each contacting portion has an overall axial length and an overall circumferential width with the plurality of contacting portions arranged in two parallel circumferential rows of circumferentially spaced contacting portions about the cylindrical base portion.

13. The tolerance ring of claim 12 wherein the second axial transition length of each contacting portion is located at an inside boundary of the two parallel circumferential rows.

14. The tolerance ring of claim 12 wherein the plurality of contacting portions in each of the two parallel circumferential rows are arranged so that the second axial transition length is alternately located at an inside boundary of a circumferential row and an outside boundary of a circumferential row.

15. The tolerance ring of claim 1 wherein each contacting portion has an overall axial length and an overall circumferential width with the plurality of contacting portions arranged in an even number of parallel circumferential rows of circumferentially spaced contacting portions about the cylindrical base portion.

16. The tolerance ring of claim 15 wherein the plurality of contacting portions in each of the parallel circumferential rows are arranged so that the second axial transition length is alternately located at an inside boundary of a circumferential row and an outside boundary of a circumferential row.

17. The tolerance ring of claim 16 wherein the contacting portions of alternating circumferential rows are grouped in axial alignment with alternating axially aligned groups of contacting portions being circumferentially offset.

18. The tolerance ring of claim 16 wherein the number of parallel circumferential rows equals four.

* * * * *

UNITED STATES PATENT AND TRADEMARK OFFICE
CERTIFICATE OF CORRECTION

PATENT NO.        : 7,611,303 B2                               Page 1 of 1
APPLICATION NO. : 11/142096
DATED             : November 3, 2009
INVENTOR(S)       : Hanrahan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 205 days.

Signed and Sealed this

Twelfth Day of October, 2010

David J. Kappos
*Director of the United States Patent and Trademark Office*